US011675689B2

United States Patent
Yu et al.

(10) Patent No.: US 11,675,689 B2
(45) Date of Patent: Jun. 13, 2023

(54) HYBRID TEST SCRIPTS FOR TRANSITIONING BETWEEN TRAFFIC EVENTS AND USER INTERFACE EVENTS

(71) Applicant: MICRO FOCUS LLC, Santa Clara, CA (US)

(72) Inventors: Yan-Jun Yu, Shanghai (CN); Er-Xin Shang, Shanghai (CN); Fei Gao, Shanghai (CN)

(73) Assignee: MICRO FOCUS LLC, Sanford, NC (US)

( * ) Notice: Subject to any disclaimer, the term of this patent is extended or adjusted under 35 U.S.C. 154(b) by 282 days.

(21) Appl. No.: 17/204,798

(22) Filed: Mar. 17, 2021

(65) Prior Publication Data

US 2022/0300401 A1    Sep. 22, 2022

(51) Int. Cl.
    *G06F 11/36*       (2006.01)
    *G06F 21/31*       (2013.01)
    *H04L 67/561*      (2022.01)

(52) U.S. Cl.
    CPC ...... *G06F 11/3684* (2013.01); *G06F 11/3688* (2013.01); *G06F 11/3692* (2013.01); *G06F 21/31* (2013.01); *H04L 67/561* (2022.05)

(58) Field of Classification Search
    CPC .. G06F 11/36; G06F 11/3684; G06F 11/3688; G06F 11/3692
    See application file for complete search history.

(56) References Cited

U.S. PATENT DOCUMENTS

| 5,745,767 A * | 4/1998 | Rosen ................ G06F 11/3684 717/124 |
| 8,612,806 B2 | 12/2013 | Rossi |
| 8,677,324 B2 | 3/2014 | Markuza et al. |
| 9,448,916 B2 | 9/2016 | Browne et al. |
| 9,819,569 B2 | 11/2017 | Berkovitch et al. |
| 10,509,719 B2 * | 12/2019 | Shani ................ G06F 11/3692 |
| 10,534,700 B2 * | 1/2020 | Shani ................ G06F 11/3612 |
| 10,552,290 B2 * | 2/2020 | Amichai ............ G06F 3/04847 |
| 10,635,407 B2 * | 4/2020 | Gorenshtein ....... G06F 9/45512 |
| 10,742,436 B2 | 8/2020 | Franke et al. |
| 11,119,899 B2 * | 9/2021 | Shani ................ G06F 11/3684 |
| 11,372,750 B2 * | 6/2022 | Huang ................ G06N 20/00 |
| 2010/0153780 A1 * | 6/2010 | Kirtkow ............. G06F 11/3684 714/E11.178 |
| 2014/0244831 A1 * | 8/2014 | Berkovitch ............ H04L 43/50 709/224 |

(Continued)

OTHER PUBLICATIONS

Micro Focus LoadRunner (10 pages).
Record and Playback Test Scripts in Minutes (3 pages).

*Primary Examiner* — Kamini B Patel (57) ABSTRACT

According to examples, an apparatus may include a processor and a memory on which are stored machine-readable instructions that when executed by the processor, may cause the processor to track traffic events and user interface (UI) events in parallel and record a first event of a hybrid test script. The first event may be recorded in a traffic mode to record one or more of the traffic events. The processor may transition from the traffic mode to a UI mode and, responsive to the transition from the traffic mode to the UI mode, may share session data between the traffic events and the UI events. Based on the session data, the processor may record a second event of the hybrid test script in the UI mode.

20 Claims, 6 Drawing Sheets

(56) References Cited

U.S. PATENT DOCUMENTS

| | | | | |
|---|---|---|---|---|
| 2015/0007149 A1* | 1/2015 | Maddela | ............. | G06F 11/3684 |
| | | | | 717/131 |
| 2015/0278076 A1* | 10/2015 | Bs | ....................... | G06F 11/3664 |
| | | | | 714/38.1 |
| 2016/0162397 A1* | 6/2016 | Kalyanasundram | ......................... | |
| | | | | G06F 11/3684 |
| | | | | 714/38.14 |
| 2018/0020098 A1* | 1/2018 | Cliche | ................... | H04M 7/006 |
| 2020/0327047 A1* | 10/2020 | Mayhew | ............. | G06F 11/3692 |
| 2021/0352106 A1* | 11/2021 | Luo | ...................... | H04L 63/0823 |

\* cited by examiner

HYBRID TEST SCRIPTS FOR TRANSITIONING BETWEEN TRAFFIC EVENTS AND USER INTERFACE EVENTS

BACKGROUND

Electronic apparatuses, such as mobile devices, tablets, desktop computers, laptop computers, and/or the like, may connect to servers over a network. Electronic apparatuses may execute performance tests to determine levels of performance of the electronic apparatuses or devices connected to the electronic apparatuses.

BRIEF DESCRIPTION OF THE DRAWINGS

Features of the present disclosure are illustrated by way of example and not limited in the following figure(s), in which Ike numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Electronic apparatuses, such as mobile devices, tablets, desktop computers, laptop computers, and/or the like, may connect to servers over a network. The electronic apparatuses may execute performance tests to determine a level of performance of any one of the connected devices. For instance, the performance test may test a performance of an application under test (AUT) residing on the electronic apparatuses or the electronic device itself. Alternatively or additionally, the performance test may test a performance of a device connected to the electronic device via a network, such as the server. Performance tests may include, for instance, traffic-based load tests and UI-based tests. The traffic-based load tests and the UI-based tests may provide different types of capabilities, and may normally be used independently with respect to each other for different situations.

A traffic-based test script may have the benefit of being relatively more efficient when scaling the number of virtual users (Vusers), while in some instances, a UI-based test script may be preferable when the traffic-based test script cannot handle a certain scenario, e.g., a login step using proprietary technology, a human-input verification, and/or the like. In some examples, the traffic-based test script may be unable to continue processing without administrator intervention and/or modification of the script in cases where correlation issues exist, such as when some dynamic values are generated by a client script in the browser, e.g., a timestamp, magic numbers, etc. In these examples, it may be difficult to automatically correct the traffic-based test script without administrator intervention.

In contrast, for UI-based test scripts, UI-based automation tools for testing may launch real browsers (or other client applications) to simulate user behaviors, and thus their implementations may be straightforward and relatively easier to get started when compared to traffic-based test scripts. However, UI-based test scripts may suffer from their heavy consumption of computing resources, particularly when the number of Vusers is scaled up on the same machine, e.g., hundreds or thousands of Vusers.

Disclosed herein are methods, apparatuses, and computer-readable mediums, in which a processor may generate a hybrid test script. In the hybrid test script, the traffic-based test script and the UI-based test script may co-exist to supplement each other in one scenario. In some examples, the processor may determine an executable path in the hybrid test script to transition between the traffic-based test script and the UI-based test script. User session data may be stored in a session container and shared between the traffic-based test script and the UI-based test script to enable seamless transition between the traffic/UI modes and maintain session states, for instance, user login, authentication, and/or the like.

By enabling a processor to generate hybrid test scripts that may include both a load test script and a UI test script, rapid development of the load test script may be possible and maintenance costs associated with updating/maintaining the traffic test script may be reduced. In some examples, the processor may seamlessly transition at run time between the traffic mode (load test mode) and the UI mode (browser mode) automatically without user monitoring or configuration, thereby enhancing efficiency of the processor by increasing the speed and scalability of the test script. The implementation of the hybrid test scripts as disclosed herein may also reduce consumption of computing resources compared to a UI-based test script, while enabling generation of web traffic-based test scripts having complex scenarios.

Figure 1:
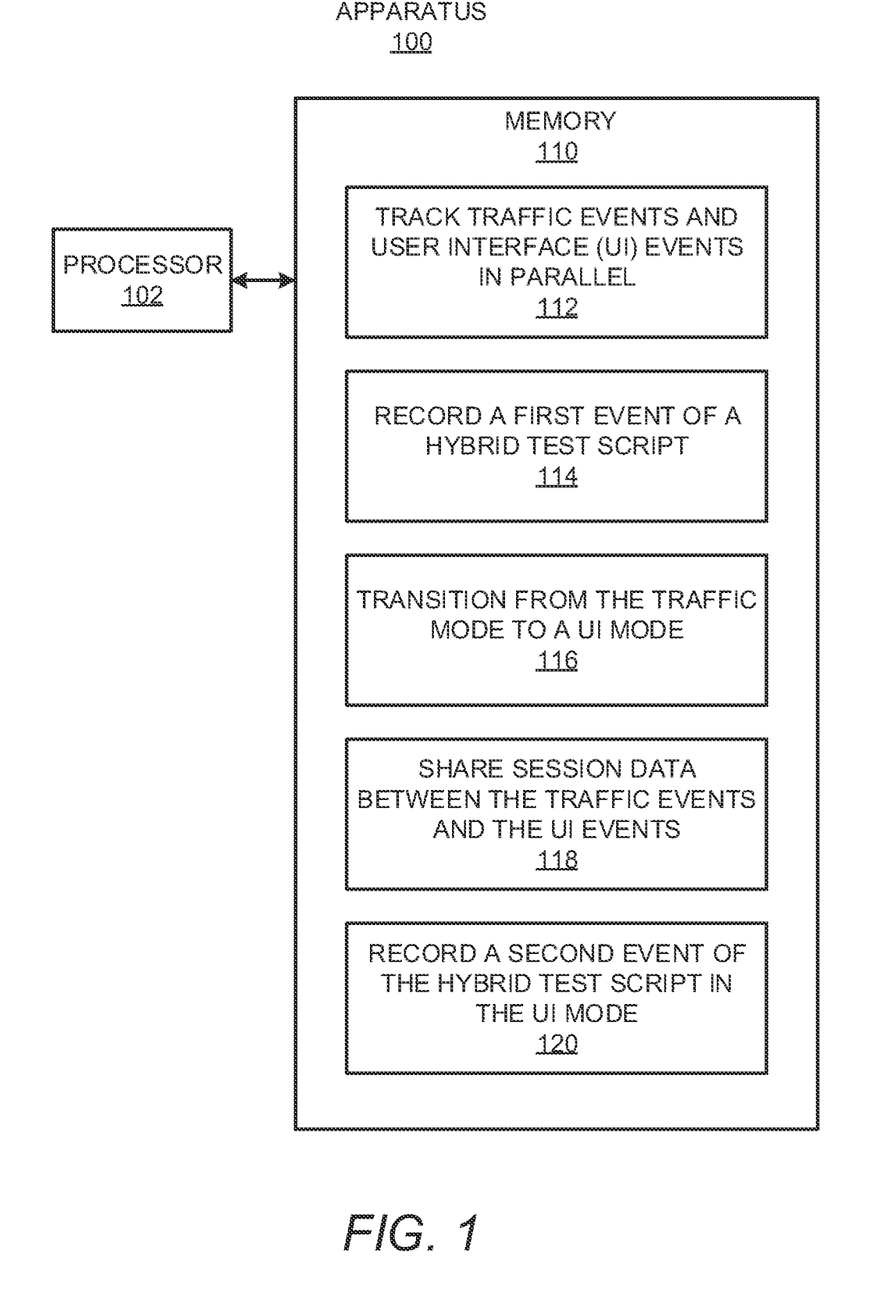
FIG. 1 shows a block diagram of an example apparatus that may track traffic events and user interface (UI) events and record the events in a hybrid test script, in which the hybrid test script may include a first event in a traffic mode and a second event in a UI mode.
Figure 2:
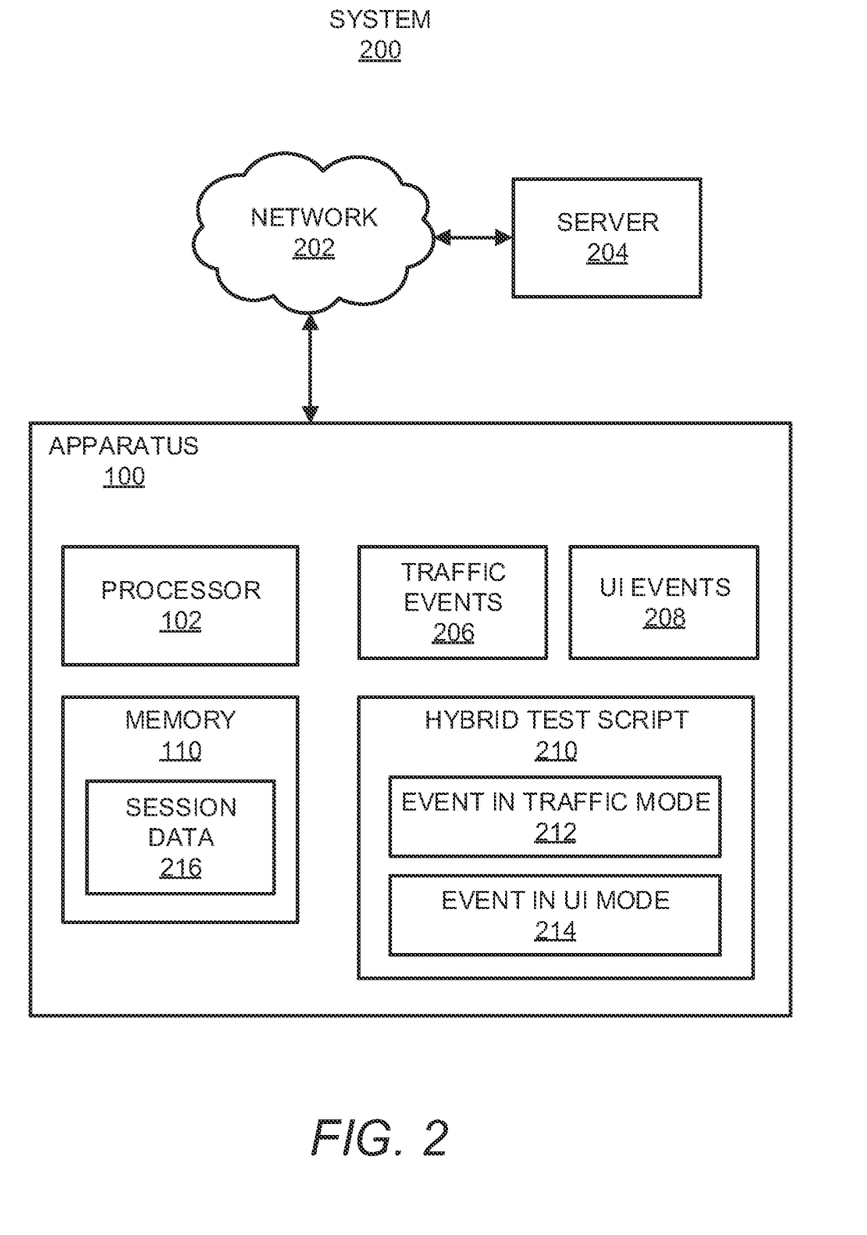
FIG. 2 shows a block diagram of an example system in which the example apparatus depicted in FIG. 1 may be implemented.
Figure 3:
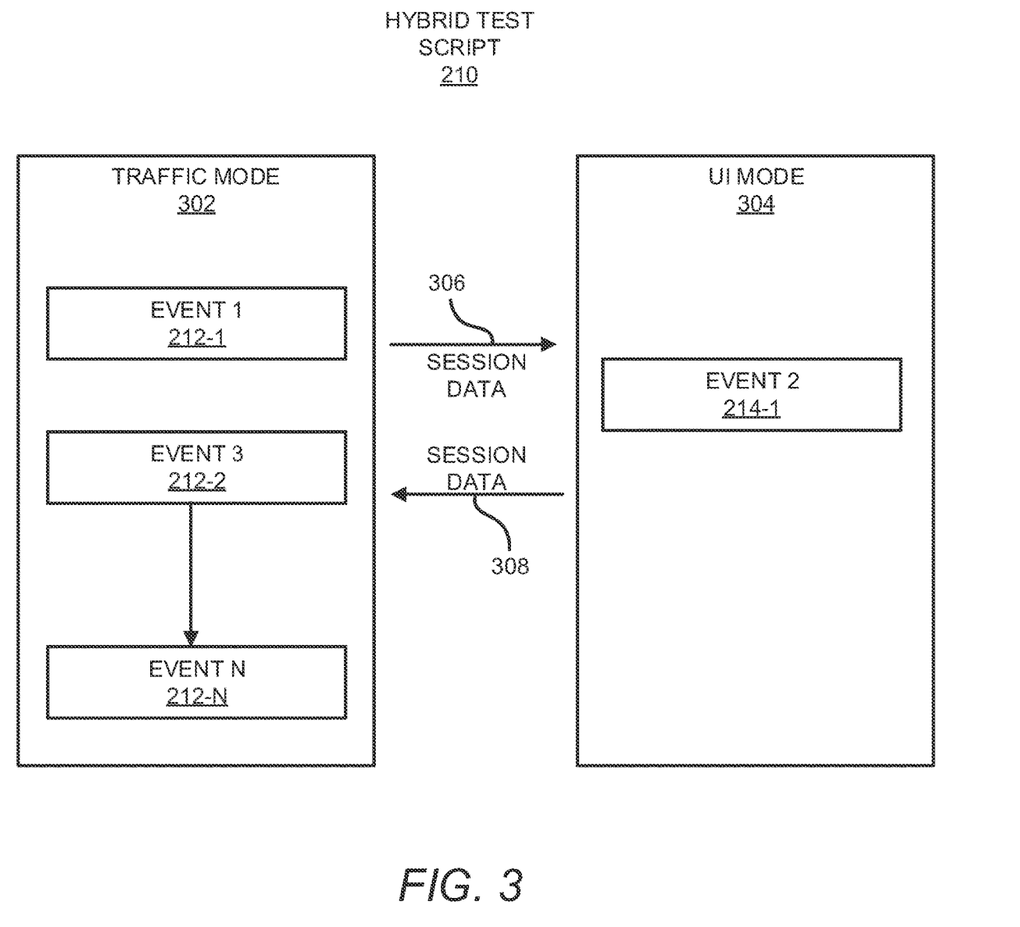
FIG. 3 shows a block diagram of an example hybrid test script that may include traffic-based test scripts in a traffic mode and UI-based test scripts in a UI mode, and that may transition between the traffic mode and the UI mode.
Figure 4:
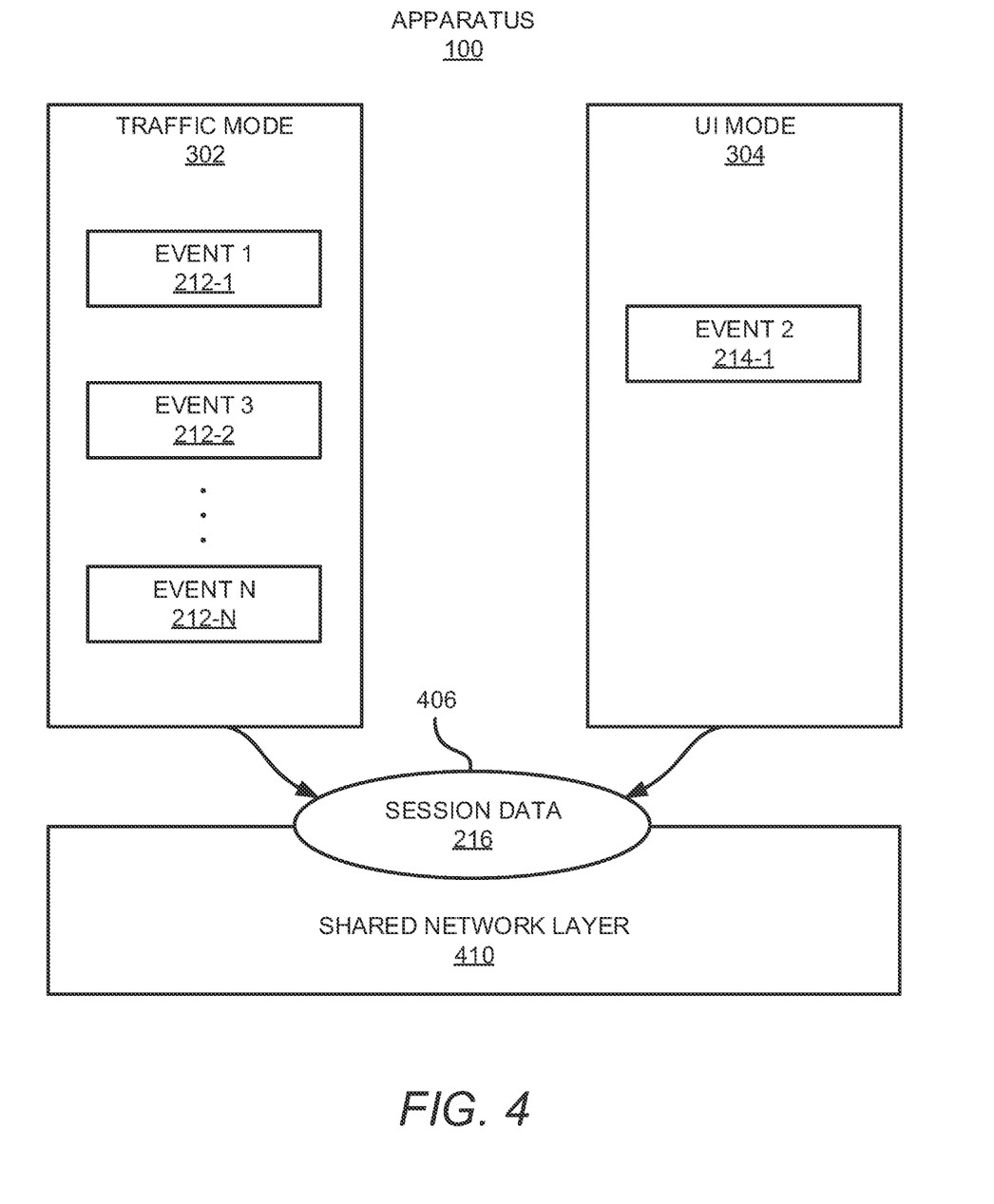
FIG. 4 shows a block diagram of an example apparatus that may store session data in a shared network layer, which may be accessible to traffic-based test scripts in a traffic mode and UI-based test scripts in a UI mode of a hybrid test script.

Reference is made to FIGS. 1-4. FIG. 1 shows a block diagram of an example apparatus 100 that may track traffic events 206 and UI events 208 and record the events in a hybrid test script 210, in which the hybrid test script 210 may include a first event in a traffic mode 302 and a second event in a UI mode 304. FIG. 2 shows a block diagram of an example system 200 in which the example apparatus 100 depicted in FIG. 1 may be implemented. FIG. 3 shows a block diagram of an example hybrid test script 210 that may include traffic-based test scripts in a traffic mode 302 and UI-based test scripts in a UI mode 304, and that may transition between the traffic mode 302 and the UI mode 304. FIG. 4 shows a block diagram of an example apparatus 100 that may store session data 216 in a shared network layer 410, which may be accessible to traffic-based test scripts in a traffic mode 302 and UI-based test scripts in a UI mode 304 of a hybrid test script 210.

It should be understood that the example apparatus 100 depicted in FIGS. 1 and 2, the example system 200 depicted in FIG. 2, the example hybrid test script 210 depicted in FIG. 3, and the example apparatus 100 depicted in FIG. 4 may include additional features and that some of the features described herein may be removed and/or modified without departing from the scopes of the apparatus 100, the system 200, and/or the example hybrid test script 210.

The apparatus 100 may be a server (such as a management server), a node in a network (such as a client device), a personal computer, a laptop computer, a tablet computer, a smartphone, and/or the like. As shown in FIGS. 1 and 2, the apparatus 100 may include a processor 102 and a memory 110, e.g., a non-transitory computer-readable medium. In some examples, the apparatus 100 may be a client device connected to a server 204 via a network 202.

The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read-Only Memory (ROM), flash memory, solid state drive, Random Access memory (RAM), an Erasable Programmable Read-Only Memory (EPROM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the memory 110 may have stored thereon instructions 112-120 that the processor 102 may fetch, decode, and execute to track traffic events 206 and UI events 208 (also referred to herein as transactions or steps), and record at least one of the traffic events 206 and UI events 208 in a hybrid test script 210. In some examples, the hybrid test script 210 may include a first event 212 in a traffic mode 302 and a second event 214 in a UI mode 304. The instructions 112-120 may be non-transitory machine-readable instructions (or equivalently, non-transitory computer-readable instructions).

The processor 102 may fetch, decode, and execute the instructions 112 to track traffic events 206 and UI events 208 in parallel. In some examples, the traffic events 206 and the UI events 208 may be events tracked on the apparatus 100. The traffic events 206 may be traffic-based load testing scenarios. In some examples, the traffic events 206 may be based on actual user input. Alternatively or additionally, the traffic events 206 may be implemented via virtual users (also referred to as Vusers) in the form of web HTTP scripts.

The UI events 208 may be user interface based events. In some examples, the UI events 208 may be implemented via actual user inputs at a browser interface. Alternatively or additionally, the UI events 208 may be implemented via virtual users in the form of UI-based automation. In any regard, the processor 102 may track the traffic events 206 and the UI events 208, in parallel.

In some examples, the processor 102 may launch a traffic recorder to record the traffic events 206 and a UI action recorder to record the UI events 208. The traffic recorder and the UI action recorder may be launched together to track the traffic events 206 and the UI events 208 in parallel, and may synchronize the traffic events 206 and the UI events 208. The event data for the traffic events 206 and the UI events 208 may be synchronized through various methods including, for instance, by the use of timestamps. In other examples, the processor 102 may achieve synchronization of the event data by swapping a browser's network engine with the one used for the traffic recording.

In some examples, the processor 102 may separately generate events, which may be grouped by transaction names. The processor 102 may treat each UI event as one transaction. The transaction (or event) could be manually added by the script author for advanced manipulations, or automatically determined by the processor 102.

The processor 102 may fetch, decode, and execute the instructions 114 to record a first event 212 of the hybrid test script 210. In some examples, the first event 212 may be one or more of the traffic events 206 and may be recorded in a traffic mode.

The processor 102 may fetch, decode, and execute the instructions 116 to transition from the traffic mode 302 to a UI mode 304, as depicted by the arrow 306 in FIG. 3. In some examples, the processor 102 may start the first event 212-1 in the traffic mode 302, which may track traffic via web HTTP transactions. The processor 102 may determine whether the events 212 in the traffic mode 302 may successfully continue, and if so, the processor 102 may continue processing events 212 in the traffic mode 302. Based on a determination that the events 212 in the traffic mode 302 may not successfully continue, the processor 102 may transition to the UI mode 304 to continue processing the events in the UI mode 304.

For instance, as depicted in FIG. 3, the processor 102 may determine that the traffic mode 302 may not successfully continue after the first event 212-1. In this case, the processor 102 may transition to the UI mode 304, as depicted by the arrow 306, and may resume processing the second event 214-1 in the UI mode 304, In some examples, the processor 102 may cause the hybrid test script 210 to store a routing path for execution of scripts between the traffic mode 302 and the UI mode 304 for the hybrid test script 210.

In some examples, the processor 102 may determine points during execution of the events 212 in the traffic mode 302 (e.g., 212-1 to 212-N) or the events 214 in the UI mode 304 (e.g., 214-1) to transition 306 between the traffic mode 302 and the UI mode 304. The processor 102 may determine a first point among the points to transition 306 from the traffic mode 302 to the UI mode 304 corresponding to an event that is not executable in the traffic mode 302. In some examples, these events which may not be executable in the traffic mode 302 may include a requirement for a user login event, a human-input event, and/or the like.

In some examples, the processor 102 may determine the points to transition 306 based on detected correlation parameters, for instance, based on detected non-correlation of dynamic values in the traffic mode 302 such as when dynamic values, including timestamps, magic numbers, and/or the like, are generated by a client process in a browser. In some examples, the processor 102 may display, in the UI mode 304, the UI events 214-1, which may include at least one of a user login interface, a human input verification interface.

For instance, a user login interface may require a user to input a user identification and password, input a human signature such as for users to sign names in a web canvas in an electronic contract application, and/or the like. In other examples, a human-input verification event may be a program executed by the processor 102 to distinguish whether an input is made by a human or a machine, such as by using "Completely Automated Public Turning test to tell Computers and Humans Apart" events (CAPTCHA events). The processor 102 may determine a transition routing path between the traffic mode 302 and the UI mode 304 for the hybrid test script 210 based on the points identified for transition between the traffic mode 302 and the UI mode 304.

The processor 102 may fetch, decode, and execute the instructions 118 to share session data 216 between the a first event 212-1 in the traffic mode 302 and the second event 214-1 in the UI mode 304, in response to the transition 306 from the traffic mode 302 to the UI mode 304. The processor 102 may execute the first event 212-1 and store the session data 216, such that the session data 216 may be accessible in the UI mode 304 when executing the second event 214-1.

The processor 102 may fetch, decode, and execute the instructions 120 to record the second event 214-1 of the hybrid test script 210 in the UI mode 304. The processor 102 may store, in the UI mode 304, the session data 216 including data received through the user login interface, the human-input verification interface, and/or the like, during the second event 214-1, for later access in the traffic mode 302.

The processor 102 may determine a second point among the points to transition 308 from the UI mode 304 to the traffic mode 302. The second point may correspond to an end of a predetermined set of the events 214-1 in the UI mode 304 to resume the third event 212-2 in the traffic mode 302. For instance, the second point may be associated with an end of the user login event, the human-input verification event in a browser interface, and/or the like. In some examples, the processor 102 may selectively pause on demand and may notify relevant users to complete input in the UI mode 304 prior to proceeding with the next traffic mode 302 replay. In some examples, the processor 102 may insert rendezvous points to synchronize the transition back to the traffic mode 302, such as a point where the transition 308 will take place, so that the load will be more synchronous.

While a particular transition has been described for purposes of illustration, specifically a transition initially from the traffic mode 302 to the UI mode 304, then back to the traffic mode 302, as depicted in FIG. 3, it should be understood that different combinations of events and transitions may be possible. For instance, the processor 102 may initially begin with an event in the UI mode 304, transition to the traffic mode 302 at a particular point, then transition back to the UI mode 304. In this regard, the processor 102 may include multiple combinations of transitions in the transition routing path included in the hybrid test script 210. In some examples, the processor 102 may continuously check the progress of the events in the traffic mode 302, and may continuously transition between the UI mode 304 and the traffic mode 302, for instance, when an event in the traffic mode 302 has failed or when a predetermined set of events in the UI mode 304 has completed.

Referring to FIG. 4, the processor 102 may store session data 216 in a session container 406 in a shared network layer 410. For instance, during replay of the hybrid test script 210, the processor 102 may store the session data 216 in a shared network layer 410, which may be accessible from the traffic mode 302 and the UI mode 304, and may enable the session states to be maintained while the hybrid test script 210 transitions between the traffic mode 302 and the UI mode 304.

In some examples, the traffic mode 302 may operate based on a web HTTP replay engine and the UI mode 304 may operate based on a browser application. The processor 102 may use the same network library during the web traffic replay and a UI (e.g., browser) replay such that the session data 216 may be stored by the processor 102 in the same memory location, for each virtual user during replay of the hybrid test script 210.

Regardless of whether the processor 102 initiates a user session from the traffic mode 302 or the UI mode 304, the processor 102 may transition to execute a subsequent event while maintaining/preserving the session data 216. For instance, the processor 102 may execute the second event 214-1 to obtain user login/authentication information in the UI mode 304, and thereafter the processor 102 may execute the third event 212-2 in the traffic mode 302, without performing subsequent user login/authentication because the session data 216 for the user was preserved using the shared session data 216.

By way of particular example and for purposes of illustration, the processor 102 may detect a presence of an unresolved correlation in the login step for a web HTTP script, such as in the first event 212-1. The processor 102 may transition to the browser automation, such as the second event 214-1, to complete the login. In this case, the browser automation may have the shared network layer 410 loaded. The processor 102 may store the session data 216, including the user login data, in the memory inside shared network layer 410. The processor 102 may continue processing events in the web HTTP script, for instance the events 212-2 to 212-N in the traffic mode 302, under the same user session through use of the shared session data 216.

In some examples, the processor 102 may store the session data 216 for a plurality of users. The processor 102 may store the session data 216 in a session container 406. The session container 406 may have a container data structure to maintain user sessions in an associated map, a dictionary, and/or the like. For instance, the container data structure may be:

```
[
{"Vuser1": session_data_obj1},
{"Vuser2": session_data_obj2},
...
{"VuserN": session_data_objN}
]
```

In some examples, the session data 216 may include a user identifier, which may be associated with a user for the events 212 in the traffic mode 302 and the events 214 in the UI mode 304. The processor 102 may assign a user identifier to each virtual user, for instance, "Vuser1" to "VuserN". The processor 102 may use the user identifier as a key, regardless of whether the processor 102 is to read or write data from the traffic mode 302 or the UI mode 304. Each of the user identifiers Vuser1 to VuserN may be associated with a corresponding session data identifier, such as a session_data_obj1 to session_data_objN.

In some examples, the processor 102 may implement the shared network layer 410 as a special web proxy, which may be compatible with the session container 406 as described above. For instance, the processor 102 may store the session data 216 on a proxy server, which may associate the session data 216 with a particular user identifier. By way of particular example and for purposes of illustration, a browser instance for a virtual user, Vuser1, in the UI mode 304 may first attempt to obtain the current user's session data 216 from the proxy. This proxy may be the first proxy in a chain if any other outgoing proxies are involved. In case the processor 102 determines that the current user's session data is initially empty, the processor 102 may redirect the browser to a login page to replay the hybrid test script 210 from that point to obtain the user login/authentication information. The proxy server may associate the session data object with the Vuser ID, such that the user may subsequently appear authenticated in both the traffic mode 302 and the UI mode 304.

In some examples, the processor 102 may share the shared network layer 410 through use of a hook mechanism or a dynamic library interchange to enable the browser to load the shared network layer 410. The processor 102 may modify the web engine of the browser and may reload the dynamic library inside the browser process such that the browser can access the shared network layer 410. The modified web engine may be shared by both the browser and the web HTTP engine, and thus the session data 216 may be shared from both the traffic mode 302 and the UI mode 304.

Figure 5:
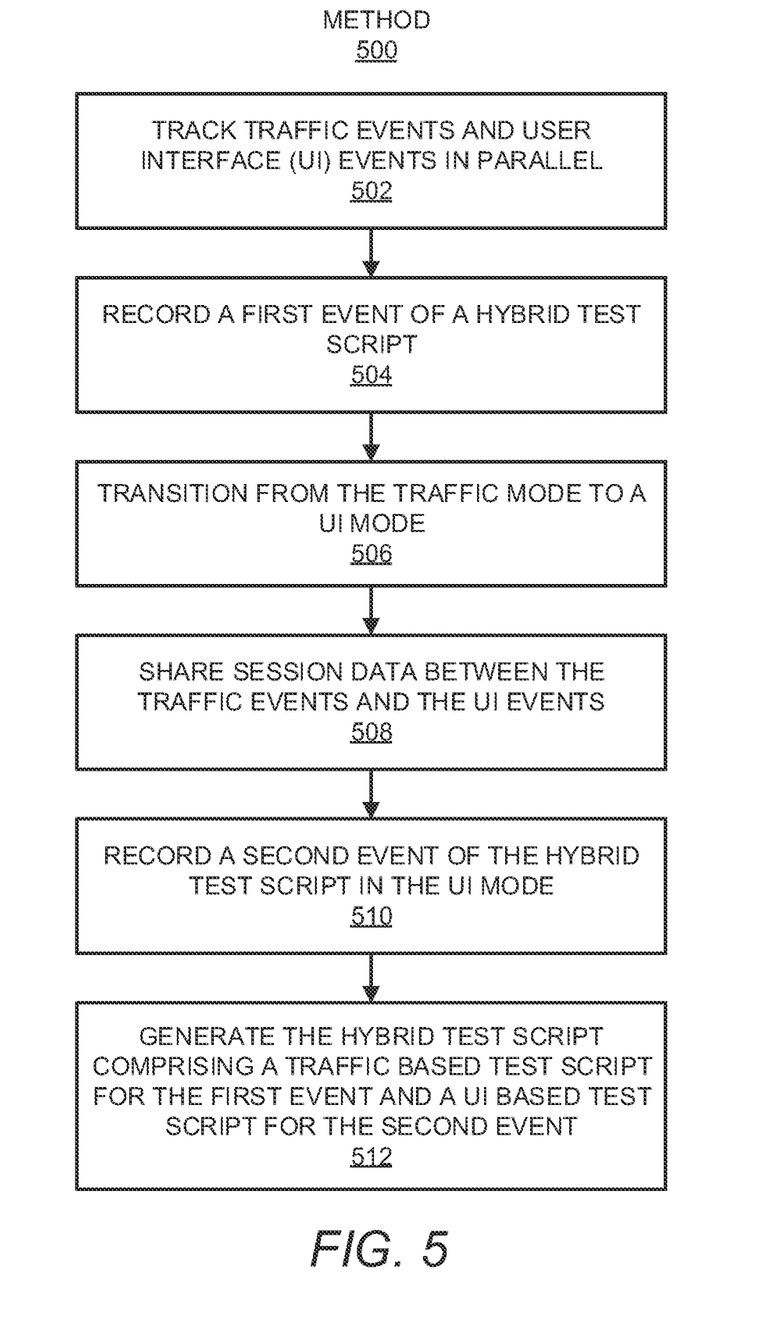
FIG. 5 shows a flow diagram of an example method of tracking traffic events and UI events and recording a first event of a hybrid test script in a traffic mode and recording a second event of the hybrid test script in a UI mode.

Various manners in which the processor 102 may operate are discussed in greater detail with respect to the method 500 depicted in FIG. 5. FIG. 5 depicts a flow diagram of an example method 500 that may track traffic events 206 and UI events 208 and record a first event of a hybrid test script in a traffic mode 302 and record a second event of the hybrid test script in a UI mode 304. It should be understood that the method 500 depicted in FIG. 5 may include additional operations and that some of the operations described therein may be removed and/or modified without departing from the scope of the method 500. The description of the method 500 is made with reference to the features depicted in FIGS. 1-4 for purposes of illustration.

At block 502, the processor 102 may track traffic events 206 and UI events 208 in parallel. At block 504, the processor 102 may record a first event 212-1 of a hybrid test script 210. The processor 102 may record the first event 212-1 in the hybrid test script 210 in a traffic mode 302 to record one or more of the traffic events 206.

At block 506, the processor 102 may transition 306 from the traffic mode 302 to the UI mode 304. At block 508, the processor 102 may share session data 216 between the traffic events 212-1 to 212-N and the UI events 214-1 responsive to the transition 306 from the traffic mode 302 to the UI mode 304.

At block 510, based on the session data 216, the processor 102 may record the second event 214-1 of the hybrid test script 210 in the UI mode 304. At block 512, the processor 102 may generate the hybrid test script 210 comprising a traffic-based test script for the first event 212-1 and a UI-based test script for the second event 214-1.

In some examples, the processor 102 may store the session data 216 in a session container 406 in a shared network layer 410. The shared network layer 410 may be accessible from the traffic mode 302 and the UI mode 304. The session data 216 may include a user identifier, which may be associated with a user for the UI events 208 and the traffic events 206. In some examples, the processor 102 may store the session data 216 on a proxy server. In this instance, the proxy server may associate the session data 216 with a user identifier.

The processor 102 may display the UI events in the UI mode 304, including at least one of a user login interface, a human-input verification interface, and/or the like. The processor 102 may store, in the UI mode 304, the session data 216 including data received through the user login interface, the human-input verification interface, and/or the like. The processor 102 may execute, in the traffic mode 302, at least one of the traffic events 206 using the session data 216 stored in the UI mode 304. In some examples, the processor 102 may synchronize the traffic events 206 and the UI events 208, which may be executing in parallel.

The processor 102 may determine points during execution of the first event 212 in the traffic mode 302 or the second event 214 in the UI mode 304 to transition between the traffic mode 302 and the UI mode 304. The processor 102 may determine a transition routing path between the traffic mode 302 and the UI mode 304 for the hybrid test script 210 based on the point to transition between the traffic mode 302 and the UI mode 304.

The processor 102 may determine a first point among the points to transition from the traffic mode 302 to the UI mode 304. The first point may correspond to an event that is not executable in the traffic mode 302. The processor 102 may determine a second point among the points to transition from the UI mode 304 to the traffic mode 302. In some examples, the second point may correspond to an end of a predetermined set of the UI events, for instance login steps, to resume in the traffic mode 302. In some examples, the event for the first point in the traffic mode 302 may be a requirement for a user login event, a human-input verification event, and/or the like, and the second point may be associated with an end of the user login event, the human-input verification event in a browser interface, and/or the like.

Some or all of the operations set forth in the method 500 may be included as utilities, programs, or subprograms, in any desired computer accessible medium. In addition, the method 500 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic apparatus capable of executing the above-described functions may perform those functions enumerated above.

Figure 6:
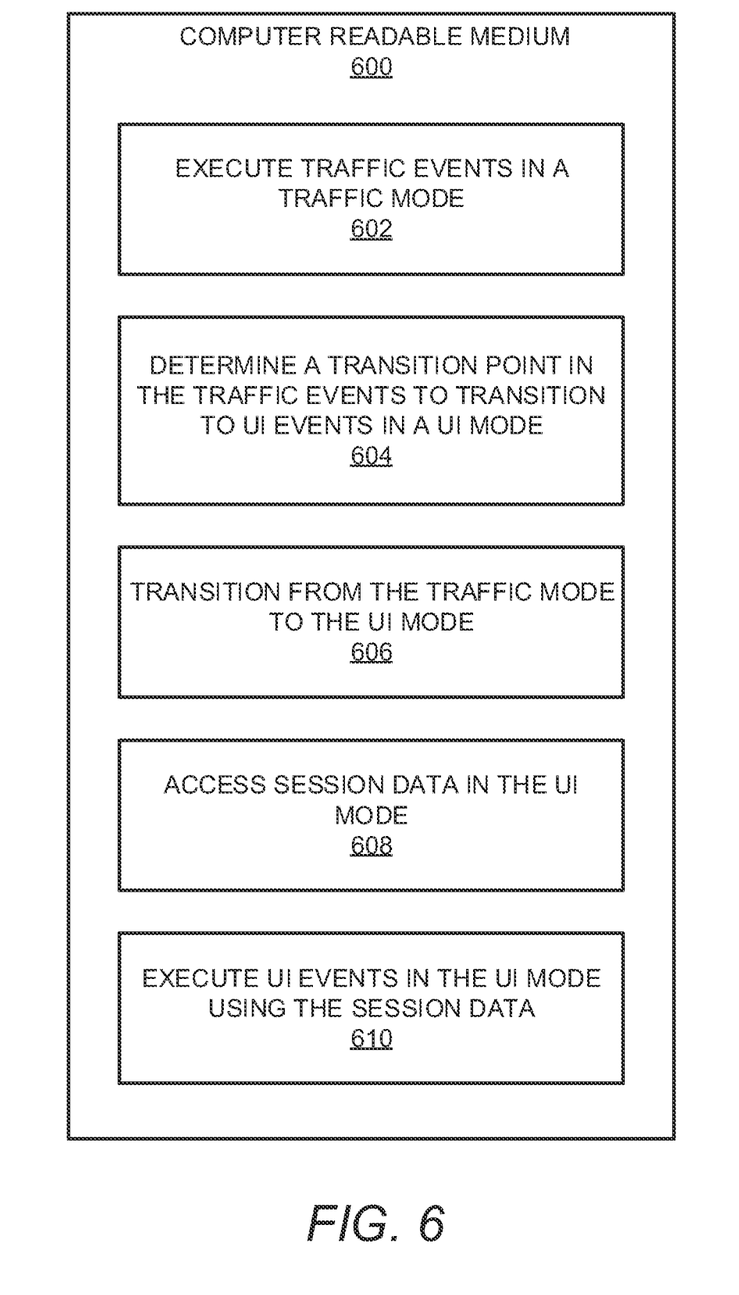
FIG. 6 shows a block diagram of an example non-transitory computer-readable medium that may have stored thereon machine-readable instructions to replay a hybrid test script, which may execute traffic events in a traffic mode, transition from the traffic mode to a UI mode, access session data from the traffic mode in the UI mode, and execute UI events in the UI mode using the session data.

Turning now to FIG. 6, there is shown a block diagram of an example non-transitory computer-readable medium 600 that may have stored thereon machine readable instructions that may replay a hybrid test script 210, which may execute traffic events in a traffic mode 302, transition from the traffic mode 302 to a UI mode 304, access session data 216 from the traffic mode 302 in the UI mode 304, and execute UI events in the UI mode 304 using the session data 216. It should be understood that the computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium. The term "non-transitory" does not encompass transitory propagating signals. The description of the non-transitory computer-readable medium 600 is also made with reference to the features depicted in FIGS. 1-4 for purposes of illustration. Particularly, the processor 102 of the apparatus 100 may execute some or all of the instructions 602-610 included in the non-transitory computer-readable medium 600.

The computer-readable medium 600 may have stored thereon machine-readable instructions 602-610 that a processor, such as the processor 102 depicted in FIGS. 1 and 2, may execute. The computer-readable medium 600 may be an electronic, magnetic, optical, or other physical storage device that contains or stores executable instructions. The computer-readable medium 600 may be, for example, RAM, EEPROM, a storage device, an optical disc, or the like.

The processor may fetch, decode, and execute the instructions 602 which may replay a hybrid test script 210 to execute traffic events, such as events in traffic events 212-1 to 212-N depicted in FIGS. 3 and 4, in a traffic mode 302. The processor may fetch, decode, and execute the instructions 604 to determine a transition point in the traffic events to transition to UI events in a UI mode 304.

The processor may fetch, decode, and execute the instructions 606 to transition, for instance as depicted by the arrow 306 in FIG. 3, from the traffic mode 302 to the UI mode 304. The processor may fetch, decode, and execute the instructions 608 to access session data 216 in the UI mode 304. The session data 216 may include session information from the traffic mode 302. The processor may fetch, decode, and execute the instructions 610 to execute UI events in the UI mode 304 using the session data 216.

In some examples, the processor may display, in the UI mode 304, the UI events including at least one of a user login interface, a human-input verification interface, and/or the like. The processor may store, in the UI mode 304, the session data 216 including data received through the user login interface, the human-input verification interface, and/or the like. The processor may execute, in the traffic mode 302, at least one of the traffic events using the session data 216 stored in the UI mode 304.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in theft broadest reasonable sense unless otherwise indicated.

What is claimed is:

1. An apparatus comprising:
a processor; and
a memory on which are stored machine-readable instructions that when executed by the processor, cause the processor to:
track traffic events and user interface (UI) events in parallel;
record a first event of a hybrid test script, the first event being recorded in a traffic mode to record one or more of the traffic events;
transition from the traffic mode to a UI mode;
responsive to the transition from the traffic mode to the UI mode, share session data between the traffic events and the UI events; and
based on the session data, record a second event of the hybrid test script in the UI mode.

2. The apparatus of claim 1, wherein the instructions cause the processor to:
store the session data in a session container in a shared network layer, the shared network layer being accessible from the traffic mode and the UI mode.

3. The apparatus of claim 2, wherein the session data includes a user identifier, the user identifier being associated with a user for the UI events and the traffic events.

4. The apparatus of claim 2, wherein the instructions cause the processor to:
store the session data on a proxy server, the proxy server to associate the session data with a user identifier.

5. The apparatus of claim 1, wherein the instructions cause the processor to:
display, in the UI mode, the second event of the hybrid test script including at least one of a user login interface or a human-input verification interface;
store, in the UI mode, the session data including data received through the user login interface or the human-input verification interface; and
execute, in the traffic mode, at least one of the traffic events using the session data stored in the UI mode.

6. The apparatus of claim 1, wherein the instructions cause the processor to:
synchronize the traffic events and the UI events which are executing in parallel.

7. The apparatus of claim 1, wherein the instructions cause the processor to:
determine points during execution of the first event in the traffic mode or the second event in the UI mode to transition between the traffic mode and the UI mode; and
determine a transition routing path between the traffic mode and the UI mode for the hybrid test script based on the points to transition between the traffic mode and the UI mode.

8. The apparatus of claim 7, wherein the instructions cause the processor to:
determine a first point among the points to transition from the traffic mode to the UI mode, the first point corresponding to an event that is not executable in the traffic mode; and
determine a second point among the points to transition from the UI mode to the traffic mode, the second point corresponding to an end of a predetermined set of the UI events to resume the traffic mode.

9. The apparatus of claim 8, wherein
the event for the first point in the traffic mode is a requirement for a user login event or a human-input verification event, and
the second point is associated with an end of the user login event or the human-input verification event in a browser interface.

10. A method comprising:
tracking, by a processor, traffic events and user interface (UI) events in parallel;

recording, by the processor, a first event of a hybrid test script, the first event being recorded in a traffic mode to record one or more of the traffic events;

transitioning, by the processor, from the traffic mode to a UI mode;

responsive to the transition from the traffic mode to the UI mode, sharing, by the processor, session data between the traffic events and the UI events;

based on the session data, recording, by the processor, a second event of the hybrid test script in the UI mode; and generating, by the processor, the hybrid test script comprising a traffic-based test script for the first event and a UI-based test script for the second event.

11. The method of claim 10, further comprising:
storing the session data in a session container in a shared network layer, the shared network layer being accessible from the traffic mode and the UI mode.

12. The method of claim 11, wherein the session data includes a user identifier, the user identifier being associated with a user for the UI events and the traffic events.

13. The method of claim 11, further comprising:
storing the session data on a proxy server, the proxy server to associate the session data with a user identifier.

14. The method of claim 10, further comprising:
displaying, in the UI mode, the second event of the hybrid test script including at least one of a user login interface or a human-input verification interface;

storing, in the UI mode, the session data including data received through the user login interface or the human-input verification interface; and executing, in the traffic mode, at least one of the traffic events using the session data stored in the UI mode.

15. The method of claim 10, further comprising:
synchronizing the traffic events and the UI events which are executing in parallel.

16. The method of claim 10, further comprising:
determining points during execution of the first event in the traffic mode or the second event in the UI mode to transition between the traffic mode and the UI mode; and determining a transition routing path between the traffic mode and the UI mode for the hybrid test script based on the point to transition between the traffic mode and the UI mode.

17. The method of claim 16, further comprising:
determining a first point among the points to transition from the traffic mode to the UI mode, the first point corresponding to an event that is not executable in the traffic mode; and determining a second point among the points to transition from the UI mode to the traffic mode, the second point corresponding to an end of a predetermined set of the UI events to resume the traffic mode.

18. The method of claim 17, wherein
the event for the first point in the traffic mode is a requirement for a user login event or a human-input verification event, and the second point is associated with an end of the user login event or the human-input verification event in a browser interface.

19. A non-transitory computer-readable medium on which is stored machine-readable instructions that, when executed by a processor, cause the processor to:

replay a hybrid test script, wherein to replay the hybrid test script, the processor is to:
execute traffic events in a traffic mode;
determine a transition point in the traffic events to transition to UI events in a UI mode;
transition from the traffic mode to the UI mode;
access session data in the UI mode, the session data including session information from the traffic mode; and
execute UI events in the UI mode using the session data.

20. The non-transitory computer-readable medium of claim 19, further comprising:
display, in the UI mode, the UI events including at least one of a user login interface or a human-input verification interface;

store, in the UI mode, the session data including data received through the user login interface or the human-input verification interface; and execute, in the traffic mode, at least one of the traffic events using the session data stored in the UI mode.

* * * * *